United States Patent Office 3,770,667

Patented Nov. 6, 1973

3,770,667

PHONOGRAPH RECORD ADDITIVE

Don C. Tucker, Hacienda Heights, Calif., assignor to ABC Dispersion Chemical Co., Los Angeles, Calif.

No Drawing. Filed Oct. 1, 1971, Ser. No. 185,803
Int. Cl. C08f *21/02;* C08g *17/00*
U.S. Cl. 260—22 CB 16 Claims

ABSTRACT OF THE DISCLOSURE

The disclosure describes a fluid phonograph record additive comprising about 30–90% grinding vehicle and about 10–70% carbon black, said carbon black having an average particle diameter of less than nine and preferably less than 1 millimicron. The use of the foregoing fluid additive in vinyl plastic phonograph records results in phonograph records which may be produced more efficiently and which have low noise and improved processability.

BACKGROUND OF THE INVENTION

The present invention relates to phonograph records. More particularly, the present invention relates to a fluid phonograph record additive which imparts to vinyl plastic phonograph records low noise and improved processability.

Phonograph records are mass produced by the following process. The original lacquer disk, termed the original, is metallized and then electroplated. The plating is separated from the lacquer and reinforced by backing with a solid metal plate. This assembly, called the master, is then electroplated. This plating is separated from the master and reinforced by backing with a solid plate. The resulting assembly, called the mother, is electroplated and reinforced by a solid metal plate, forming an assembly termed the stamper. Several stampers are made from each mother. One stamper containing a sound selection to be placed on one side of the final record is mounted in the upper jaw of a hydraulic press; another stamper containing a sound selection to be placed on the other side of the record is placed in the lower jaw of a hydraulic press. The press is equipped with means for heating and cooling the stampers. A preform, or biscuit, of thermoplastic material such as a vinyl plastic, e.g., "Vinylite" is placed between the two stampers. The stampers are heated, and the jaws of the press are closed to bring the two stampers against the thermoplastic material. When an impression of the stampers has been obtained in the thermoplastic material, the stampers are cooled, thus cooling and setting the plastic record. The jaws of the hydraulic press are opened, and the record is removed from the press. The modulated grooves in the record correspond to those in the original lacquer disk. The stamping procedure is repeated again and again until the desired number of records is obtained or until the stamper wears out. This process constitutes the mass-production technique for the production of phonograph records.

Typically, the phonograph records made by the foregoing process comprise vinyl plastics, e.g., "Vinylite," together with fillers, stabilizers, colorants, etc. Thus, finely divided carbon black has been used as a filler and also to impart the commercially acceptable deep black color to the phonograph record. In the past, dry, finely divided carbon black has been added in amounts of about 1% by weight to the dry vinyl plastic or wax, e.g., U.S. Pats. No. 2,221,270 and 2,216,970, respectively.

As indicated by these patents, one of the problems connected with phonograph records is noise or static resulting from friction between the recording stylus and the phonograph record. A second problem relates to the life expectancy of the stamper. That is, the number of records which can be molded from a single stamper before the stamper becomes sufficiently worn that it does not properly reproduce new records. In this connection, it should be noted that the average life expectancy of a stamper is about 1,000 records. A third problem relates to the stamping time necessary for each record. Obviously, longer residency time in the stamper decreases the efficiency of the expensive equipment used to manufacture the records.

It has now been discovered that a fluid composition containing extremely finely divided carbon black may be added to the vinyl plastic record stock to produce a low noise record disk capable of being stamped in substantially less time than heretofore and which also provides for substantially longer stamper life.

SUMMARY OF THE INVENTION

The present invention relates to a fluid phonograph record additive comprising about 30–90% by weight grinding vehicle and about 10–70% by weight carbon black, said carbon black having an average particle diameter of less than 9 millimicrons.

The present invention also relates to a method for decreasing the processing time and improving the efficiency of production of mass produced vinyl plastic phonograph records which comprises homogeneously mixing vinyl plastic with about 0.1 to about 1% by weight of the fluid phonograph record additive described above.

The present invention also relates to a thermoplastic composition suitable for use in forming mass produced vinyl plastic phonograph records comprising vinyl plastic and about 0.1 to about 1% by weight of the fluid phonograph record additive described above.

The present invention also relates to a phonograph record comprising vinyl plastic and about 0.1 to about 1% by weight of the fluid phonograph record additive described above.

DESCRIPTION OF THE INVENTION

The vinyl plastics which may be used in the present invention include polymers and resins derived by polymerization or copolymerization of vinyl monomers (vinyl compounds) including vinyl chloride and acetate, vinylidene chloride, methyl acrylate and methacrylate, acrylonitrile, styrene, the vinyl ethers, and numerous others characterized by the presence of a carbon double bond in the monomer molecule, which opens during polymerization to make possible the carbon chain of the polymer. A simple case is the conversion of vinyl chloride $H_2C:CHCl$ to polyvinyl chloride $(—CH_2—CHCl—)_n$. The preferred vinyl plastics which may be used in the present invention include polyvinyl chloride, polyvinyl acetate and mixtures thereof.

The grinding vehicle used in the present invention provides a suitable vehicle for grinding the carbon black to the necessary particle size. The grinding vehicle also functions to provide improved flow characteristics to the vinyl plastics thereby substantially decreasing stamping times as indicated in the examples herein. The grinding vehicle also functions to provide a fluid additive for use with the vinyl plastic which unexpectedly results in improved properties of the resulting vinyl plastic-additive mixture.

Grinding vehicles which may be used in the present invention are liquid materials which include alkyd resins; stabilizers, such as, for example, tin mercaptate; fatty acids, such as, for example, linseed oil; mineral oils; plasticizers which are compatible with vinyl polymers, such as, for example, cyclohexanone, epoxy, plasticizers; esters of dibasic acids, such as, for example, phthalic, adipic, sebacic, maleic, succinic, etc. Some of the more common are dibutyl phthalate, dioctyl phthalate, dihexyl sebacate, dilauryl adipate diamyl maleate and 2-ethylhexyl succinate. In addition to the simple esters, there are many mixed esters, such as, for example, acetyl tributyl citrate, butyl phthalyl butyl glycolate, dibutyl phenyl phosphate and butoxyethyl stearate. Among the plasticizer resins are the low molecular weight polyesters, such as, for example, polyethylene adipate. Other plasticizer resins include the terpene resins and esters of abietic acid, as well as the phenolics and polyamides. In addition to the foregoing, other plasticizers include liquid amines and liquid higher ethers, alcohols, such as, for example, ethylene glycol; ketones; and hydrocarbons, such as, for example, waxes, diamyl diphenyl and chlorohydrocarbons, such as, for example, the dichlorodiphenyls.

The alkyd resins which may be used in the present invention are prepared by reacting di- and polyhydric alcohols with dibasic acids. Suitable di- and polyhydric alcohols include glycerol, pentaerythritol, ethylene glycol, diethylene glycol, propylene glycol, sorbitol, mannitol and mixtures thereof. Suitable dibasic acids include phthalic acid, isophthalic acid, maleic acid, fumaric acid, succinic acid, adipic acid, azelaic acid, sebacic acid, the anhydrides of the preceding acids and mixtures thereof. The preferred dibasic acid is isophthalic anhydride.

The alkyds used in the present invention may be modified with drying and semi-oils such as, for example, linseed oil, dehydrated castor oil and soya bean oil. The preferred oil is alkali-refined linseed oil. The alkyds may be further modified with other synthetic and modified natural resins including phenolic and maleic resin. Methods of making the foregoing alkyds are well known in the art as exemplified in the book Polymers and Resins, Golding, Van Nostrand Company, 1959.

The amount of grinding vehicle which may be used in the present invention varies from about 30 to about 90% and preferably from about 50 to about 80% by weight of the additive composition.

The carbon black which may be used in the present invention is conventional carbon black which has been ground to an extremely small particle size. Thus, the carbon black is ground to an average particle size of less than 9 and preferably less than 1 millimicron. It has also been found that the amount of carbon black advantageously used in the present composition is inversely proportional to the particle size of the carbon black. Thus, as the particle diameter becomes small, i.e., less than 1 millimicron, the amount of carbon black necessary to give a uniform dispersion in a given amount of vinyl plastic is reduced. Reducing the particle size to the range above stated results in lowered noise and, surprisingly, to a substantially increased stamper life as indicated by the examples herein. Furthermore, it has been discovered that the foregoing unexpected results are achieved by the introduction of the carbon black into the vinyl plastic in a fluid vehicle compatible with the vinyl plastic, as discussed above.

The amount of carbon black which may be used in the present invention ranges from about 10 to about 70% and preferably from about 20 to about 50% by weight of the additive composition.

Styrene monomer may also be used in the present invention. The addition of styrene monomer results in a phonograph record having excellent gloss characteristics which are desirable from the point of consumer acceptance, improved stability and improved processability. The amount of styrene which may be added to the present invention ranges from about 5–20% and preferably about 10% by weight of the additive composition.

There may also be added to the present composition minor amounts of various conventional antioxidants, pigments, solvents, dyes, etc. In particular, the amount of dye which may be used in the present invention varies from about 5–15 and preferably about 10% by weight of the additive composition.

The foregoing fluid record additive composition may be combined with the vinyl plastic in an amount ranging from about 0.1 to about 1 and preferably about 0.2 to about 0.5% by weight of the vinyl plastic. Suitable amounts of conventional vinyl stabilizers such as lead stearate and calcium stearate may also be used. Organic solvents, such as, for example, toluene may be added to the composition for the purpose of adjusting the composition to the desired viscosity and for improved flow. The amount of organic solvent which may be used varies from about 1–100% by weight of the final vinyl plastic composition.

The composition of the present invention may be prepared in the following manner. A suitable container is charged with the liquid portion of the composition, i.e., the grinding vehicle and styrene monomer, and mixed at ambient temperature until homogeneous. Into this mixture is blended the dry portion of the composition, i.e., the carbon black and dye if desired. The resultant composition is ground on a conventional 3 roll mill or other suitable grinding apparatus capable of reducing the particle size of the carbon black to less than 9 and preferably less than 1 millimicron until the desired particle size is produced. As indicated above, the viscosity may be adjusted by addition of a suitable organic solvent. The final phonograph record composition is prepared by combining a suitable amount of the foregoing fluid record additive with the desired amounts of vinyl plastic stabilizers and solvents.

The present invention may be further described and illustrated with reference to the following examples. It is to be understood that the following examples are for the purpose of illustration and the invention is not to be regarded as limited to any one of the specific compounds or conditions recited therein. Unless otherwise stated, "parts" is part by weight.

EXAMPLE I

(1) Record additive composition 60 parts of alkyd varnish [1] and 10 parts styrene monomer were combined and mixed in a high speed mixer for about 10 minutes at ambient temperature. To this homogeneous mixture was added slowly 20 parts carbon black [2] and 10 parts dye.[3] After additional mixing for about 45 minutes, the resultant homogeneous composition was ground on a 3 roll mill until the carbon black had an average particle diameter of less than 1 millimicron. The final composition had the consistency of a heavy grease.

(2) New phonograph record composition 0.3 part of the fluid record additive composition of Example I(1) was combined in a mechanical mixer with the following compounds until the mixture was homogeneous.

96.2 parts vinyl plastic [4]
1155 parts stabilizer [5]
2.0 parts toluene.

See footnotes at end of col. 5.

(3) Conventional phonograph record composition 1 part of dry carbon black[2] was combined in a mechanical mixer with the following compounds until the mixture was homogeneous.

95.5 parts vinyl plastic[4]
1.5 parts stabilizer[5]
2.0 parts toluene.

EXAMPLE II

To compare the processability of the new record composition set forth in Example I(2) against that of the conventional record composition set forth in Example I(3), the following tests were made with identical nickel faced stampers on automatic phonograph record producing apparatus.

The stamper using the conventional composition of Example I(3) produced approximately 1,000 records at an average mold time of 30 seconds. The stamper using the new composition of Example I(2) produced approximately 1,500 records at an average mold time of 25 seconds.

Thus, use of the additive of the present invention results in a 50% improvement in the number of records which are made from a given stamper. This unexpected improvement may result from the decreased particle size of the carbon black and the concomitant lower wear on the stamper. In addition use of the additive of the present invention also results in a 20% reduced mold time due to the improved flow characteristics of the thermoplastic composition.

EXAMPLE III

Example I(2) is repeated, except 0.8 part of the composition of Example I(1) is used instead of 0.3 part.

EXAMPLE IV

Example II is repeated, except the record composition of Example III is used instead of the record composition of Example I(2). Related results are achieved.

EXAMPLE V

Examples I(1) and I(2) are repeated, except that 40 parts of dioctyl phthalate are used instead of the alkyd varnish.

EXAMPLE VI

Example II is repeated, except the record composition of Example V is used instead of the record composition of Example I(2). Related results are achieved.

EXAMPLE VII

Examples I(1) and I(2) are repeated, except that 80 parts of tin mercaptate are used instead of the alkyd varnish.

EXAMPLE VIII

Example II is repeated, except the record composition of Example VII is used instead of the record composition of Example I(2). Related results are achieved.

EXAMPLE IX

Examples I(1) and I(2) are repeated, except that 60 parts of linseed oil are used instead of the alkyd varnish.

EXAMPLE X

Example II is repeated, except the record composition of Example IX is used instead of the record composition of Example I(2). Related results are achieved.

EXAMPLE XI

Examples I(1) and I(2) are repeated, except that 50 parts of ethylene glycol are used instead of alkyd varnish.

EXAMPLE XII

Example II is repeated except that the record composition of Example XI is used instead of the record composition of Example I(2). Related results are achieved.

What is claimed is:

1. A fluid phonograph record additive comprising about 30–90% by weight of a liquid grinding vehicle selected from the group consisting of alkyd resins, fatty acids and plasticizers and stabilizers of vinyl plastic, and about 10–70% by weight carbon black, said carbon black having an average particle diameter of less than 1 millimicron.

2. A composition as in claim 1 additionally containing about 5–20% by weight styrene monomer.

3. A composition as in claim 2 containing about 50 to about 80% by weight grinding vehicle and about 20 to about 50% by weight carbon black.

4. A composition as in claim 1 additionally containing about 5–15% by weight dye.

5. A composition as in claim 1 where the grinding vehicle is selected from the group consisting of alkyd resins, terpene polymers, fatty acids, minerals oils and plasticizers and stabilizers of vinyl plastic.

6. A composition as in claim 5 wherein the alkyd resin is an isophthalic alkyd resin.

7. A composition as in claim 6 wherein the isophthalic alkyd resin is modified with an alkali refined linseed oil.

8. A fluid phonograph record additive comprising about 50 to about 80% by weight of a drying oil modified isophthalic alkyd resin, about 20 to about 50% by weight carbon black, about 5–20% by weight styrene monomer and about 5–15% by weight blue toner, said carbon black having an average particle diameter of less than 1 millimicron.

9. A thermoplastic composition suitable for use in forming mass produced vinyl plastic phonograph records comprising vinyl plastic and about 0.1 to about 1% by weight of the composition of claim 1.

10. A composition as in claim 9 additionally containing about 2% by weight toluene.

11. A thermoplastic composition suitable for use in forming mass produced vinyl plastic phonograph records comprising vinyl plastic and about 0.1 to about 1% by weight of the composition of claim 8.

12. A composition as in claim 11 additionally containing about 2% by weight toluene.

13. A phonograph record comprising vinyl plastic and about 0.1 to about 1% by weight of the record additive of claim 1.

14. A phonograph record comprising vinyl plastic and about 0.1 to about 1% by weight of the record additive of claim 8.

15. A method for decreasing the processing time and improving the efficiency of production of mass produced vinyl plastic phonograph records which comprises homogeneously mixing vinyl plastic with about 0.1 to about 1% by weight of the fluid record additive composition of claim 1 and forming the phonograph record with the resulting composition.

16. A method for decreasing the processing time and improving the efficiency of production of mass produced vinyl plastic phonograph records which comprises homogeneously mixing vinyl plastic with about 0.2 to about 0.5% by weight of the fluid record additive composition

---

[1] Alkyd varnish: Lawter Chemical Co., "100–S," modified with alkali refined linseed oil; having the following specification: Acid No. of 10; alcohol No. of 25.0; wt./gallon of 8.25; viscosity—90–''–100'' or #3+litho.

[2] Carbon black: Cabot Corporation "Monarch 4" having an average particle diameter of 15–25 millimicrons.

[3] Dye: Alkali blue toner.

[4] Vinyl plastic: Dry copolymehized SS:12 (vol.:vol.) vinyl chloride: vinyl acetate.

[5] Stabilizer: ⅔ lead stearate, ⅓ calcium stearate.

of claim 8 and forming the phonograph record with the resulting composition.

References Cited

UNITED STATES PATENTS

| | | | |
|---|---|---|---|
| 2,997,451 | 8/1961 | Miller | 274—41 R |
| 2,221,270 | 11/1940 | Severin | 106—37 |
| 2,217,170 | 10/1940 | Hunter | 106—37 |
| 2,607,699 | 8/1952 | Sutheim | 106—37 |
| 2,216,970 | 10/1940 | Walker | 106—37 |
| 2,379,976 | 7/1945 | Maddock | 260—41 |
| 2,572,798 | 10/1951 | Ayers | 106—37 |
| 3,352,817 | 11/1967 | Meyer et al. | 260—45.7 |

FOREIGN PATENTS

| | | | |
|---|---|---|---|
| 470,066 | 12/1950 | Canada | 106—37 |

OTHER REFERENCES

Defensive Publication T866,002, Naudain, published Sept. 2, 1969, 866,O.G. 21.

DONALD E. CZAJA, Primary Examiner

R. W. GRIFFIN, Assistant Examiner

U.S. Cl. X.R.

106—37, 308 R, 308 F, 308 M; 260—22 A, 23 P, 40 R, 41 R; 274—41 A